United States Patent
Barsony et al.

(10) Patent No.: US 10,467,252 B1
(45) Date of Patent: Nov. 5, 2019

(54) DOCUMENT CLASSIFICATION AND CHARACTERIZATION USING HUMAN JUDGMENT, TIERED SIMILARITY ANALYSIS AND LANGUAGE/CONCEPT ANALYSIS

(71) Applicant: DiscoverReady LLC, New York, NY (US)

(72) Inventors: Stephen John Barsony, King of Prussia, PA (US); Yerachmiel Tzvi Messing, Baltimore, MD (US); David Matthew Shub, Cranford, NJ (US); Philip L. Richards, Charlotte, NC (US); Stephen H. Schreiber, Warren, MI (US)

(*) Notice: Subject to any disclaimer, the term of this patent is extended or adjusted under 35 U.S.C. 154(b) by 199 days.

(21) Appl. No.: 13/754,780

(22) Filed: Jan. 30, 2013

Related U.S. Application Data (60) Provisional application No. 61/592,487, filed on Jan. 30, 2012.

(51) Int. Cl.
*G06F 16/28* (2019.01)

(52) U.S. Cl.
CPC ................... *G06F 16/285* (2019.01)

(58) Field of Classification Search
CPC ......... G06F 17/30011; G06F 17/30598; G06F 17/30705; G06F 17/3071; G06F 17/30713; G06F 16/93; G06F 16/35; G06F 16/355; G06F 16/358; G06F 16/285
USPC ........................................................ 707/737
See application file for complete search history.

(56) References Cited

U.S. PATENT DOCUMENTS

| | | | |
|---|---|---|---|
| 5,832,470 A * | 11/1998 | Morita et al. | |
| 6,356,899 B1 | 3/2002 | Chakrabarti et al. | |
| 6,389,413 B2 | 5/2002 | Takahashi et al. | |
| 6,687,696 B2 | 2/2004 | Hofmann et al. | |
| 6,694,331 B2 * | 2/2004 | Lee .................. | G06F 17/30011 707/706 |
| 6,738,760 B1 | 5/2004 | Krachman | |
| 6,778,977 B1 | 8/2004 | Avadhanam et al. | |
| 7,328,216 B2 | 2/2008 | Hofmann et al. | |
| 7,366,714 B2 | 4/2008 | Krachman | |
| 7,475,107 B2 | 1/2009 | Maconi et al. | |
| 7,480,251 B2 | 1/2009 | Foschiano et al. | |
| 7,519,589 B2 | 4/2009 | Charnock et al. | |
| 7,519,673 B2 | 4/2009 | Zakarian et al. | |
| 7,556,806 B2 | 7/2009 | Wang | |
| 7,574,433 B2 | 8/2009 | Engel | |
| 7,593,995 B1 | 9/2009 | He et al. | |
| 7,617,195 B2 * | 11/2009 | Liang ............... | G06F 17/30011 |
| 7,640,323 B2 | 12/2009 | Sun | |

(Continued)

FOREIGN PATENT DOCUMENTS

| | | |
|---|---|---|
| EP | 1588535 A1 | 10/2005 |
| EP | 2113850 A2 | 11/2009 |

(Continued)

*Primary Examiner* — Michael Pham
(74) *Attorney, Agent, or Firm* — Mintz, Levin, Cohn, Ferris, Glovsky and Popeo, P.C.

(57) ABSTRACT

Systems, methods, and articles are provided for characterizing and defining groups within large corpuses of documents using a combination of one or more of human judgment, tiered similarity analysis techniques, and language/concept analysis. Related apparatus, systems, techniques and articles are also described.

14 Claims, 3 Drawing Sheets

(56) References Cited

U.S. PATENT DOCUMENTS

| | | | |
|---|---|---|---|
| 7,644,138 B2 | 1/2010 | Sun | |
| 7,657,522 B1 | 2/2010 | Puzicha et al. | |
| 7,657,603 B1 | 2/2010 | He et al. | |
| 7,671,187 B2 | 3/2010 | Aguirre et al. | |
| 7,680,773 B1* | 3/2010 | Acharya | G06F 17/30864 707/737 |
| 7,692,807 B1 | 4/2010 | Sanders et al. | |
| 7,716,196 B2 | 5/2010 | Ghielmetti et al. | |
| 7,730,113 B1 | 6/2010 | Payette et al. | |
| 7,743,051 B1 | 6/2010 | Kashyap et al. | |
| 7,747,455 B2 | 6/2010 | Barr et al. | |
| 7,747,631 B1 | 6/2010 | Puzicha et al. | |
| 7,761,427 B2 | 7/2010 | Martin et al. | |
| 7,779,152 B2 | 8/2010 | Narayanan | |
| 7,791,355 B1 | 9/2010 | Esher et al. | |
| 7,792,945 B2 | 9/2010 | Paknad et al. | |
| 7,801,761 B2 | 9/2010 | Varadarajan et al. | |
| 7,890,440 B1 | 2/2011 | Hardy | |
| 7,933,859 B1 | 4/2011 | Puzicha et al. | |
| 8,296,309 B2 | 10/2012 | Brassil et al. | |
| 8,396,871 B2* | 3/2013 | Barsony et al. | 707/737 |
| 8,706,742 B1* | 4/2014 | Ravid et al. | 707/749 |
| 8,769,708 B2* | 7/2014 | Messing et al. | 726/30 |
| 8,818,996 B2 | 8/2014 | Barney | |
| 2002/0147867 A1* | 10/2002 | Satlow | G06F 19/328 710/100 |
| 2003/0105765 A1* | 6/2003 | Smith et al. | 707/100 |
| 2004/0243391 A1 | 12/2004 | Nelson et al. | |
| 2006/0053104 A1 | 3/2006 | Ferrari et al. | |
| 2006/0085216 A1 | 4/2006 | Guerrero | |
| 2007/0244915 A1* | 10/2007 | Cha et al. | 707/101 |
| 2008/0033904 A1 | 2/2008 | Ghielmetti et al. | |
| 2008/0038286 A1 | 2/2008 | Geng et al. | |
| 2008/0065811 A1 | 3/2008 | Jahangiri | |
| 2008/0081781 A1 | 4/2008 | Lippa et al. | |
| 2008/0082929 A1 | 4/2008 | Stignani et al. | |
| 2008/0108713 A1 | 5/2008 | Begovich et al. | |
| 2008/0219557 A1 | 9/2008 | Dawson et al. | |
| 2008/0229037 A1 | 9/2008 | Bunte et al. | |
| 2008/0244034 A1 | 10/2008 | Shannon et al. | |
| 2008/0282355 A1 | 11/2008 | Nemazi et al. | |
| 2008/0319984 A1 | 12/2008 | Proscia et al. | |
| 2009/0030754 A1 | 1/2009 | McNamar | |
| 2009/0055503 A1 | 2/2009 | Crivella et al. | |
| 2009/0076142 A1 | 3/2009 | Han et al. | |
| 2009/0077136 A1 | 3/2009 | Igawa et al. | |
| 2009/0089539 A1 | 4/2009 | Bunker et al. | |
| 2009/0097662 A1 | 4/2009 | Olechowski et al. | |
| 2009/0106239 A1 | 4/2009 | Getner et al. | |
| 2009/0106276 A1 | 4/2009 | Bouchard | |
| 2009/0111976 A1 | 4/2009 | Aguirre et al. | |
| 2009/0125506 A1 | 5/2009 | Kim | |
| 2009/0150168 A1 | 6/2009 | Schmidt | |
| 2009/0150431 A1 | 6/2009 | Schmidt et al. | |
| 2009/0150866 A1 | 6/2009 | Schmidt | |
| 2009/0150906 A1 | 6/2009 | Schmidt et al. | |
| 2009/0164435 A1 | 6/2009 | Routt | |
| 2009/0164522 A1 | 6/2009 | Fahey | |
| 2009/0164588 A1 | 6/2009 | D'Amato et al. | |
| 2009/0164790 A1 | 6/2009 | Pogodin | |
| 2009/0165026 A1 | 6/2009 | Paknad et al. | |
| 2009/0187797 A1 | 7/2009 | Raynaud-Richard et al. | |
| 2009/0192944 A1 | 7/2009 | Sidman et al. | |
| 2009/0198651 A1 | 8/2009 | Shiffer et al. | |
| 2009/0198670 A1 | 8/2009 | Shiffer et al. | |
| 2009/0198674 A1 | 8/2009 | Custis et al. | |
| 2009/0198677 A1 | 8/2009 | Sheehy et al. | |
| 2009/0198689 A1 | 8/2009 | Frazier et al. | |
| 2009/0199274 A1 | 8/2009 | Frazier et al. | |
| 2009/0216696 A1* | 8/2009 | Downs | G06F 17/30675 706/20 |
| 2009/0233850 A1 | 9/2009 | McFadden et al. | |
| 2009/0254572 A1 | 10/2009 | Redlich et al. | |
| 2009/0262682 A1 | 10/2009 | Khetawat et al. | |
| 2009/0262683 A1 | 10/2009 | Khetawat et al. | |
| 2009/0262684 A1 | 10/2009 | Khetawat et al. | |
| 2009/0262702 A1 | 10/2009 | Khetawat et al. | |
| 2009/0262703 A1 | 10/2009 | Khetawat et al. | |
| 2009/0262704 A1 | 10/2009 | Khetawat et al. | |
| 2009/0264095 A1 | 10/2009 | Khetawat et al. | |
| 2009/0264126 A1 | 10/2009 | Khetawat et al. | |
| 2009/0265199 A1 | 10/2009 | Moerdler et al. | |
| 2009/0265542 A1 | 10/2009 | Khetawat et al. | |
| 2009/0265543 A1 | 10/2009 | Khetawat et al. | |
| 2009/0265609 A1* | 10/2009 | Rangan et al. | 715/234 |
| 2009/0270423 A1 | 10/2009 | Blackwell et al. | |
| 2009/0276413 A1 | 11/2009 | Uchida | |
| 2009/0276467 A1* | 11/2009 | Scholtes | G06F 17/30011 |
| 2009/0287685 A1 | 11/2009 | Charnock et al. | |
| 2009/0319312 A1 | 12/2009 | Moerdler et al. | |
| 2009/0319506 A1 | 12/2009 | Ngan | |
| 2009/0326969 A1 | 12/2009 | Paknad et al. | |
| 2009/0327048 A1 | 12/2009 | Kisin et al. | |
| 2009/0327049 A1 | 12/2009 | Kisin et al. | |
| 2009/0327375 A1 | 12/2009 | Paknad et al. | |
| 2010/0017239 A1 | 1/2010 | Saltzman et al. | |
| 2010/0023353 A1 | 1/2010 | Stoffiere | |
| 2010/0030798 A1* | 2/2010 | Kumar et al. | 707/102 |
| 2010/0046792 A1 | 2/2010 | Anderson et al. | |
| 2010/0046827 A1 | 2/2010 | Anderson et al. | |
| 2010/0070265 A1 | 3/2010 | Nelson et al. | |
| 2010/0077301 A1 | 3/2010 | Bodnick et al. | |
| 2010/0082382 A1 | 4/2010 | Kisin et al. | |
| 2010/0082548 A1 | 4/2010 | Crockett et al. | |
| 2010/0082555 A1 | 4/2010 | Ogawa et al. | |
| 2010/0082676 A1 | 4/2010 | Paknad et al. | |
| 2010/0097662 A1 | 4/2010 | Churilla et al. | |
| 2010/0106685 A1 | 4/2010 | Ott et al. | |
| 2010/0107156 A1 | 4/2010 | Andersen et al. | |
| 2010/0114832 A1 | 5/2010 | Lillibridge et al. | |
| 2010/0125664 A1 | 5/2010 | Hadar et al. | |
| 2010/0131470 A1 | 5/2010 | Schmidt | |
| 2010/0138500 A1 | 6/2010 | Consul et al. | |
| 2010/0138653 A1 | 6/2010 | Spencer et al. | |
| 2010/0145932 A1 | 6/2010 | Rook et al. | |
| 2010/0146056 A1 | 6/2010 | Consul et al. | |
| 2010/0146299 A1 | 6/2010 | Swaminathan et al. | |
| 2010/0161313 A1 | 6/2010 | Karttunen | |
| 2010/0161314 A1 | 6/2010 | Karttunen et al. | |
| 2010/0161639 A1 | 6/2010 | Bobrow et al. | |
| 2010/0185875 A1 | 7/2010 | Mayer et al. | |
| 2010/0198986 A1 | 8/2010 | Andersen et al. | |
| 2010/0205020 A1 | 8/2010 | Losey | |
| 2010/0306204 A1* | 12/2010 | Chitiveli | G06F 17/3071 707/752 |
| 2010/0306206 A1 | 12/2010 | Brassil et al. | |
| 2011/0270826 A1* | 11/2011 | Cha | G06F 17/30011 707/723 |
| 2012/0191708 A1* | 7/2012 | Barsony et al. | 707/737 |
| 2012/0192286 A1* | 7/2012 | Messing et al. | 726/27 |
| 2012/0330946 A1 | 12/2012 | Arredondo et al. | |
| 2013/0105765 A1* | 5/2013 | Haensch | H01L 29/42364 257/29 |
| 2013/0246430 A1* | 9/2013 | Szucs et al. | 707/738 |
| 2014/0019371 A1 | 1/2014 | Albertelli | |
| 2014/0067829 A1 | 3/2014 | Barney | |

FOREIGN PATENT DOCUMENTS

| | | |
|---|---|---|
| EP | 2214109 A1 | 8/2010 |
| WO | WO-2008020860 A2 | 2/2008 |
| WO | WO-2008022187 A1 | 2/2008 |
| WO | WO-2008027477 A2 | 3/2008 |
| WO | WO-2008070415 A2 | 6/2008 |
| WO | WO-2008070688 A1 | 6/2008 |
| WO | WO-2008083211 A1 | 7/2008 |
| WO | WO-2008127257 A2 | 10/2008 |
| WO | WO-2009052265 A1 | 4/2009 |
| WO | WO-2009085239 A2 | 7/2009 |
| WO | WO-2009094521 A1 | 7/2009 |
| WO | WO-2009102765 A2 | 8/2009 |
| WO | WO-2009129516 A1 | 10/2009 |
| WO | WO-2010022343 A2 | 2/2010 |

(56) References Cited

FOREIGN PATENT DOCUMENTS

| WO | WO-2010022346 A2 | 2/2010 |
| WO | WO-2010051260 A1 | 5/2010 |
| WO | WO-2010065458 A2 | 6/2010 |

* cited by examiner

DOCUMENT CLASSIFICATION AND CHARACTERIZATION USING HUMAN JUDGMENT, TIERED SIMILARITY ANALYSIS AND LANGUAGE/CONCEPT ANALYSIS

RELATED APPLICATION

This application claims priority to U.S. Pat. App. Ser. No. 61/592,487 filed on Jan. 30, 2012, the contents of which are hereby fully incorporated by reference.

TECHNICAL FIELD

The subject matter described herein relates to systems and techniques for characterizing and defining groups within large corpuses of documents using a combination of one or more of human judgment, tiered similarity analysis techniques, and language/concept analysis.

BACKGROUND

The increasing pervasiveness of electronic communications and computer-generated documents has created enormous problems for lawyers and their clients, who are regularly challenged to sift through terabytes of information to find relevant, privileged or confidential material in a way that is accurate, consistent and yet cost-effective. When one case can require sorting through a terabyte of data, the result can be 75 million pages for review, taking up to 375,000 hours of time. Studies have estimated that document review accounts for 50 to 90 percent of the cost involved in litigation matters, and one report has suggested that 70 percent or more of the cost of discovery is now attributable solely to human review of documents for responsiveness and privilege.

The problem with purely human review of documents is not just a problem of time and money. It is one of consistency and accuracy as well. Dozens of reviewers working on thousands of documents a day are bound to sort and code documents differently based on their subjective judgments, experience levels, fatigue and other factors. Even with sound quality control checks, the risks of making a mistake are substantial, and the results can be devastating: discovery sanctions; loss of trade secrets; loss of attorney-client privilege; or a bad outcome at trial.

SUMMARY

Systems, methods, and articles are provided for characterizing and defining groups within large corpuses of documents using a combination of one or more of human judgment, tiered similarity analysis techniques, and language/concept analysis.

In one aspect, a corpus of documents are received and/or data characterizing same. Thereafter, similarities among the document are characterizing using at least two similarity algorithms having different similarity criteria. Subsequently, stacks of documents are defined based on pre-defined grouping criteria as applied to the characterized similarities. Within each stack, a prime document is identified so that provision of each prime document to at least one human reviewer can be initiated via a computer-implemented document review and characterization system.

Various types of similarity algorithms can be used. For example, similarity algorithms can be used that identify exact duplicates of documents, identify substantial duplicates of documents, identify conceptually similar documents based on content of each respective document, and the like.

The pre-defined grouping criteria can be adjusted based on quality control review of documents within a stack other than the corresponding prime document.

In some variations, data can be received that characterizes quality control review of at least a portion of the documents. This received data can be used to modify the pre-defined grouping criteria to either increase or decrease one or more similarity metrics.

In addition, contextual characteristics can be obtained for each of the documents (for example from a different data source) and such contextual characteristics can be associated with the corresponding document. Various types of contextual characteristics can be used, for example, similarity score, type of similarity algorithm used to characterize document, document family, document type, metadata describing properties of the document, and the like.

At least a portion of the corpus of documents comprise families of documents that have a pre-defined logical interrelation.

In an interrelated aspect, a corpus of documents is received. Thereafter, a first subset of the corpus of documents is generated by identifying and characterizing similarities among the documents using a first similarity algorithm. In addition, a second subset of the corpus of documents is generated by identifying and characterizing similarities among the documents other than the first subset using a second similarity algorithm. In some implementations, the second similarity algorithm has a relaxed similarity standard as compared to the first similarity algorithm. Subsequently, stacks of documents are defined based on pre-defined grouping criteria as applied to the characterized similarities. Within each stack, a prime document is identified. Provision of each prime document to at least one human reviewer via a computer-implemented document review and characterization system can later be initiated.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides a platform to assist the human review of large corpuses of document by reducing the effort required (i.e., the number of documents requiring human review are reduced, etc.), increasing the accuracy of resulting decisions regarding documents, enhancing usability thereby making specific job functions easier to perform, and assisting the overall document classification and characterization process workflow.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to systems, methods, and articles for reviewing and characterizing large corpuses of documents for a variety of purposes in including, for example, responding to discovery requests in a litigation context. A modular arrangement is provided with each module having different features and functionality. Modules can be utilized in whole or they can be selectively turned off (or not installed as part of a particular implementation). Modules, such as automated predictive decisioning modules can be removed from an overall review process at any point in time if it is no longer desired by the client or if it proves to be ineffective during quality control (QC) sampling. This capability allows for any document corpus review to be smoothly and elegantly transitioned from any starting point including an advanced review adopting predictive technologies to a review not incorporating predictive technologies.

The current subject matter can be implemented in connection with a wide variety of platforms including, without limitation, the platform (and related systems, methods, and articles) described in co-pending application Ser. No. 13/014,643, the contents of which are hereby fully incorporated by reference, as well as the i-Decision® platform by DiscoverReady, LLC.

Figure 1:
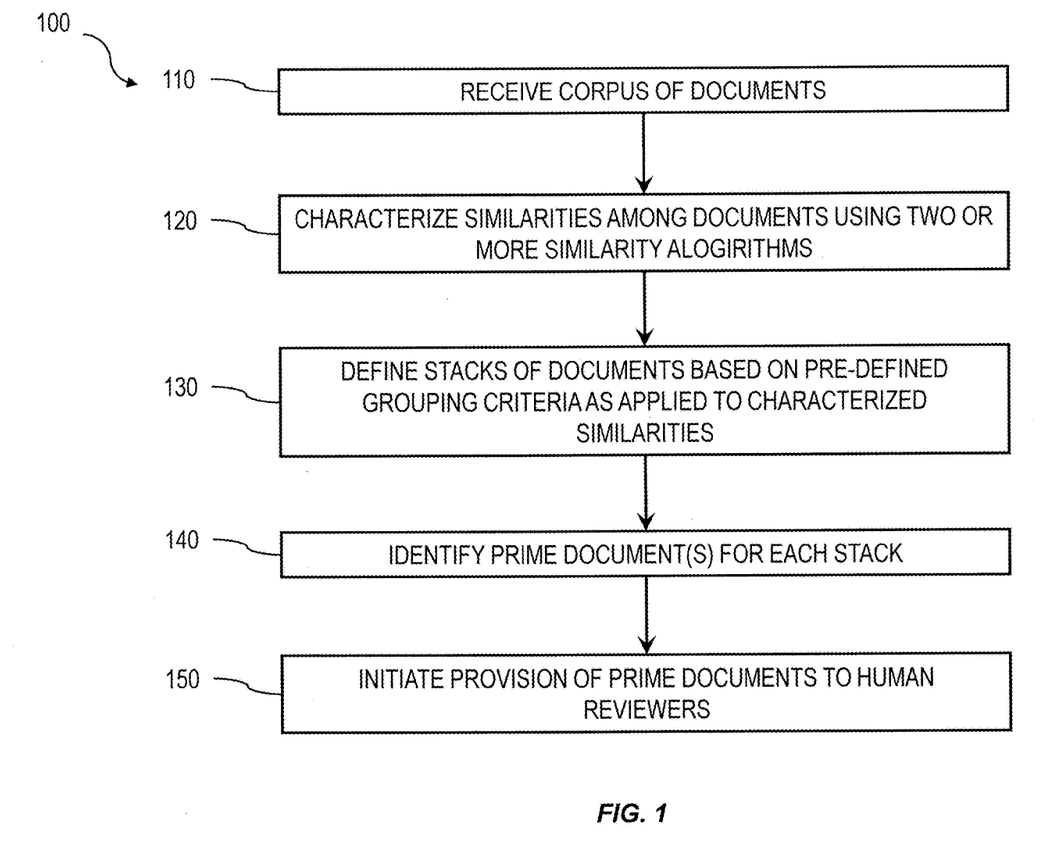
FIG. 1 is a process flow diagram illustrating categorization of documents using tiered similarity analysis methodologies.

FIG. 1 is a process flow diagram 100 illustrating a method in which, at 110, a corpus of documents is received. Thereafter, at 120, similarities among the document are characterized using at least two similarity algorithms having different similarity criteria. Based on these characterized similarities, at 130, stacks of documents are defined based on pre-defined grouping criteria as applied to the characterized similarities. Within each stack, at 140, a prime document is identified. Provision of each prime document to at least one human reviewer via a computer-implemented document review and characterization system can then, at 150, be initiated.

As used herein and unless explicitly stated otherwise, the term documents can be construed to include: documents (word processing documents, spreadsheet documents, etc.), presentations, e-mails), files (audio files, images, videos, etc.), objects (e.g., data objects, etc.), and other items (unless otherwise stated). More specifically, the term documents can be construed to comprise: spreadsheets, presentations, computer code, container files, emails, images, system files, log files, redactions, drawings, CAD files, program files, metadata, case information, custodian information, project files, or any other information relevant in an electronic discovery.

In some cases, the corpus of documents is first evaluated for workflow considerations. For example, some documents have no text or limited usable—text (for example, GIF, JPG, MPG, MP3, PNG, PPT that are all graphics and have very little text (like page numbers) and are not evaluated by any textual analysis engine (similarity & predictive). Such documents can receive full human review. In some cases, graphic/video files can be submitted to a reliable "graphic analyzer" or "audio analyzer" then these would be submitted to appropriate engines. These files can be evaluated by file hash to identify and suppress duplicate files.

Figure 2:
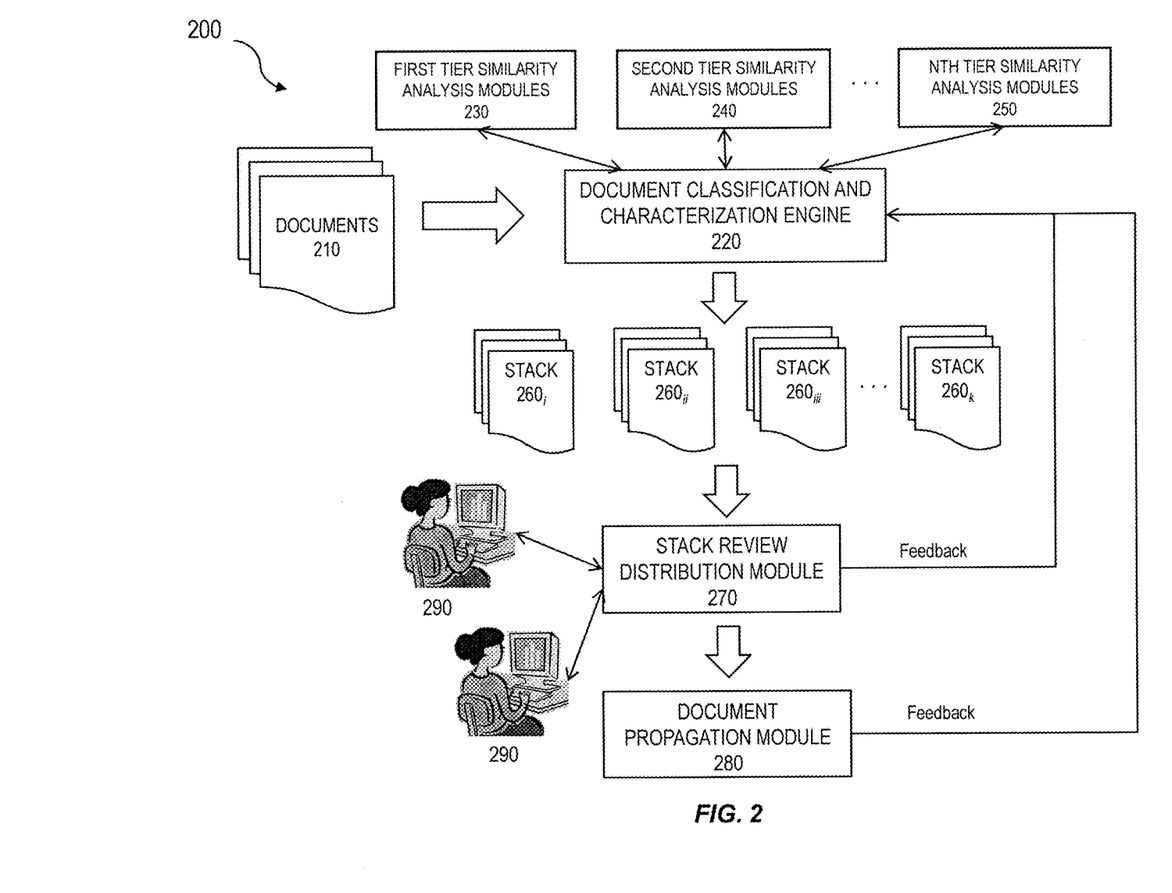
FIG. 2 is a diagram illustrating a system for analyzing and categorizing documents.

FIG. 2 is a diagram 200 illustrating a workflow in which a corpus of documents 210 are analyzed by a document classification and characterization engine 220. The document classification and characterization engine 220 utilizes similarity analysis modules in order to determine which of the documents within the corpus of documents 210 should be grouped together into respective stacks $260_{i \ldots k}$ (which in some implementations are pairwise). A stack review distribution module 270 provides at least one document from each stack (or data characterizing same) to one or more human reviewers 290 (via, for example, a computer-implemented document review and characterization system/workflow) so that the documents can be manually reviewed. The human reviewers 290 can make a determination such as irrelevant or privileged which is then applied, by a document propagation module 280 to each document in the respective stack $260_{i \ldots k}$. Propagating enables each document in a stack to be treated in a similar fashion $260_{i \ldots k}$ (e.g., produce to opposing counsel/withhold from production, etc.) In some cases, the document classification and characterization engine 220 identifies a prime document within each stack $260_{i \ldots k}$ that is indicative of the stack as a whole (e.g., for documents having overlapping content, the document with the greatest amount of content, etc.). While the components of FIG. 2 are described as separate modules, the functionality can be provided within one or more applications implemented by one or more computing systems (whether directly coupled or coupled by a network such as the Internet, etc.).

In the example of FIG. 2, illustrated are a first tier similarity analysis module 230, a second tier similarity analysis module 240 up to an nth tier similarity analysis module 250. Each of the similarity analysis modules 220-250 can utilize one or more similarity algorithms having varying standards. For example, the first tier similarity analysis module 230 can use algorithms that identify exact duplicates among the documents. Sample algorithmic techniques include, for example, MD5 and SHA1 hashing algorithm. The second tier similarity analysis module 240 can use algorithms that identify substantial duplicates (i.e., documents that are not identical but include a percentage of common subject matter above a pre-defined threshold, etc.). A third tier similarity analysis module (in this case the nth tier similarity analysis module 250) can use algorithms that identify documents having matching content or other matching criteria other than a level of content overlap as used for identical/substantially identical matching. Sample algorithmic techniques for this tier include, for example n-gram shingling; grainy hash vector (GHV) representation; I-Match.

With the multi-tiered approach, documents can be more rapidly characterized and organized into the stacks $260_{i \ldots k}$. With some implementations, each tier can consume progressively more computational/processing resources and/or can require more time to generate similarity metrics. By having the first tier analysis module 230 identify exact duplicate matches, these documents can be excluded from analysis by the second tier analysis module 240 (because such documents will already be grouped into a single stack 260$_{i \ldots k}$). Similarly, documents identified as substantially identical by the second tier analysis module 240 can be excluded from analysis by the subsequent tier analysis module and so on that require greater computational resources. For example, the use of predictive models/coding can, at times, be very computationally expensive and so such similarity algorithms are implemented after at least a portion of the documents from the corpus of documents 210 have been grouped into stacks 260$_{i \ldots k}$. In addition, the process of "unique-ing" can improve the training of the predictive coding analysis engines by limiting the number of "duplicative or very similar" documents. In the training process the evaluator is presented documents that have unique content and the engine can do a better job of predicting.

Moreover, while not illustrated, a variety of filters can also be implemented by the document classification and characterization engine 220 and/or the similarity analysis modules 230-250 that can be used to provide further criteria for grouping documents within a particular stack 260$_{i \ldots k}$. For example, the filter can provide that all documents from a particular sender are grouped into a single stack 260$_{i \ldots k}$. Filters can also be used to exclude documents from the similarity analysis and/or human review. For example, certain types of documents (e.g., audio files, marketing documents, website pages, etc.) can be selectively removed or otherwise segregated. Documents that are provided to the human reviewers 290 are sometimes characterized as enabled and/or source documents and other documents are sometimes characterized as suppressed and/or target documents (i.e., they are suppressed from review and/or propagation).

The corpus of documents 210 can comprise many families of documents. Families of documents can be, for example, e-mails within an e-mail thread, word processing or presentation documents containing embedded files, files compressed within a single ZIP file, etc. The document classification and characterization engine 220 can break apart families of documents by, for example, attachments can be removed from emails, compressed files (e.g., files in ZIP folders) can be decompressed/extracted, embedded files can be extracted from their parent files, and the like. By breaking down the document families, each resulting document can be reviewed separately—and potentially in different review assignments by different human reviewers 290. While this is advantageous in some circumstances, in other circumstances it can result in redundant and/or overlapping review. The family view model can allow for such documents to be organized in true hierarchical parent/child relationships (as opposed to just a grouping of relative documents). For example, the family view model enables distinguishing emails from their attachments and embedded files within a single attachment from other attachments to the same email. In addition, the type of family and parent document (whether this is part of an email or embedded within another file) can be characterized for referential purposes.

The family model categorization can be used as part of the review process of FIG. 2 (and also a review process as described in the co-pending application referenced above) that takes advantage of advanced automated categorization methods, such as propagation from another document and creates a batch set which present to a reviewer only those documents in a family that require human subjective review. Each document can be flagged as to whether or not it is visible (review enabled) and the number of documents flagged "visible" in the review batches can be reduced to a much smaller set of documents than would traditionally be reviewed. As all the documents have been loaded to the review application, the entire family can remain available within a review set should a human reviewer need to look at them.

The evaluation of the family members (i.e., documents determined to be within a single family) and whether they are the source/target of an automatic categorization can occur as a standalone module which can be executed against a list of ESI (electronically stored information) processed documents, separated (e.g., attachments from emails, embedded objects, etc.), and the text extracted which have not yet been subject to human review. This can occur after loading to the review application or before the documents have been exported from this ESI processing application.

Several methods of automatic categorization and the effect on the a particular family include, for example: (i) only one document of exact duplicates (with the same MD5 or other hashcode value) would be flagged as enabled; (ii) only one document of content duplicate matches would be flagged as enabled; (iii) documents that received a decision from categorization logic of a concept/relevance analysis engine would not be flagged as enabled; prime documents (as described in the co-pending application) would be flagged as enabled while stack documents (as described in the co-pending application) would not be flagged as enabled. In addition, the source/reason/classification of a document's enabled flag can be tracked.

The suppression of documents not enabled can be accomplished in a review application (i.e., an application/module enabling human review of electronic renderings of the documents, etc.) by selecting into an assignment set the documents in the review set with the condition enable for review is not set" so that the assignment "document list" only shows the enabled documents. The remaining family members can be available through a relational "family view" that is based on the unique DR Family ID.

One method for limiting a query to documents in a certain set, such as "enabled documents in a Family", is to use a field, which can be populated with a value which indicates when a document is "enabled" and when a document is not enabled. This will allow a query executed in a review application to gather only those documents in a family that have been enable for review For example, a query result that is "search hit documents with family".

Documents which have been suppressed that are not visible to the reviewer in the assignment would have a status message available to the user explaining why the document is turned off (such as "document is a duplicate of content duplicate"). This will be accomplished via the populating afield in the review application with text or HTML so that is it is available for display on a data capture interface or document list. This field may also be used to provide guidance messages to the reviewer on visible documents such as this "document is part of a family where at least one document has been categorized. For example if the logical family decision is Privileged or Responsive".

Figure 3:
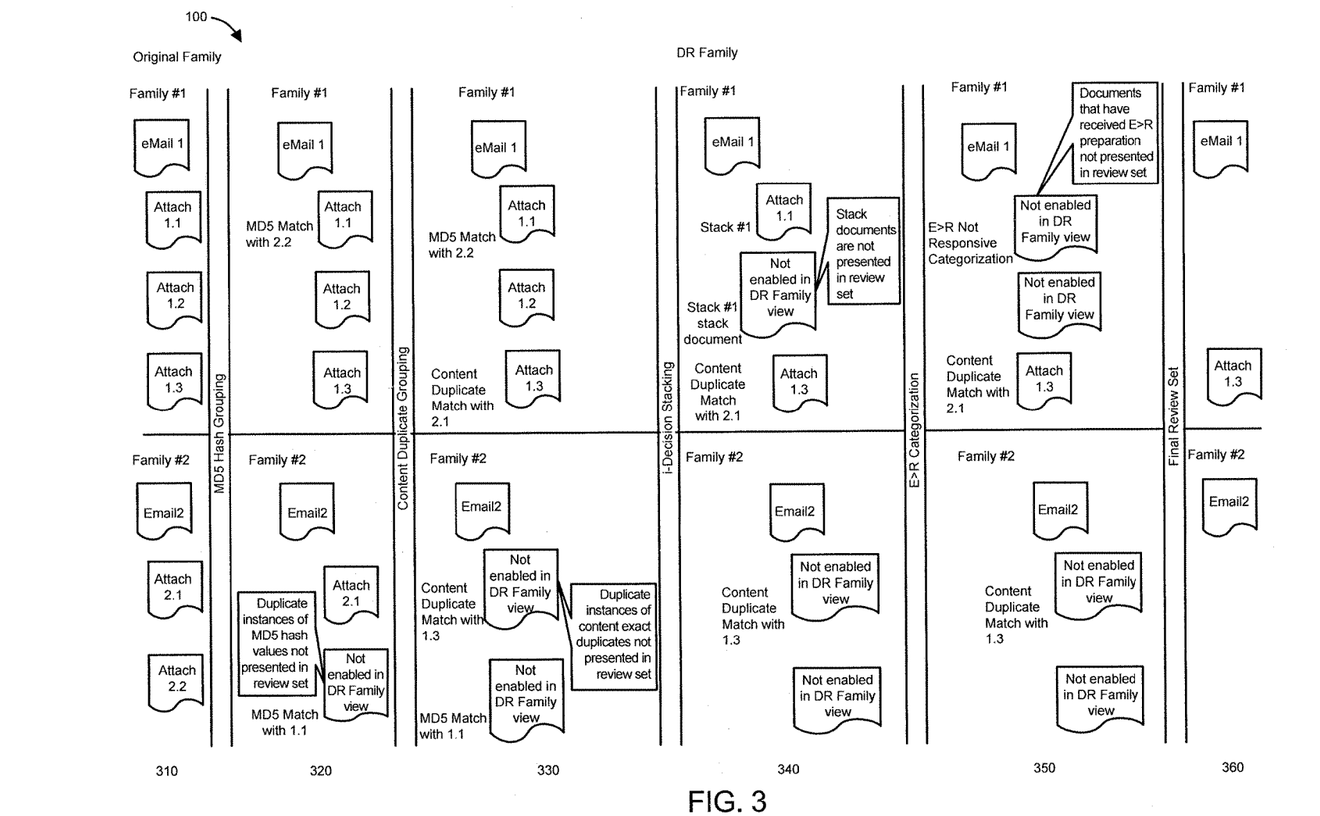
FIG. 3 is a diagram illustrating tiered similarity analyses for two families of documents.

FIG. 3 is a diagram 300 illustrating two families (Family #1, Family #2) of documents being transitioned from their original state to a smaller set of documents necessary to be reviewed (marked as enabled) as part of a tiered similarity analysis. Snapshot 310 illustrates an original state of the two families of documents. Thereafter, a first similarity analysis algorithm is applied (e.g., MD5 hash grouping, etc.) which identifies that Attachment 1.1 and Attachment 2.2 are duplicates. Thereafter, at snapshot 320 Attachment 2.2 is suppressed (i.e., it is not enabled for review by a human reviewer 290, etc.). The remaining documents are then subjected to a further similarity analysis. In this example a content duplication grouping algorithm is used which identifies that the content of Attachment 1.3 and Attachment 2.1 are duplicates/substantial duplicates. This in turn results in Attachment 2.2 being suppressed. At this point at snapshot 340, the document classification and characterization engine 220 assigns the remaining documents (i.e., the documents that are enabled) into one of the stacks $260_{i \ldots k}$. The stack review distribution module 270, at this snapshot 350, assigns documents from the stacks $260_{i \ldots k}$ to the human reviewers 290 who determine a final categorization for each stack $260_{i \ldots k}$ (e.g., produce or not produce, etc). The remaining documents (i.e., the documents identified as being subject to production, etc.) are then remaining at snapshot 360. These documents or data identifying or otherwise characterizing these documents can be then be provided (i.e., displayed, stored, and/or transmitted to a remote server, etc.).

Each of the documents can have associated contextual information that characterizes the document. Some or all of this contextual information can initially be a part of the documents within the corpus of documents 210 or it can be added/assigned by the document classification and characterization engine 220 and/or one or more of the similarity analysis modules 220-250. For example, similarity scores can be added by the similarity analysis modules 220-250. Such contextual information can be used by the human reviewers 290, analytic reports describing the methodology used to generate the stacks $260_{i \ldots k}$ and/or otherwise characterize the documents and/or stacks $260_{i \ldots k}$. The contextual information can form metadata attached to the respective documents and/or it can be stored separately. For example, document review tables can be provided that include fields, for example, Family ID, Review Enabled Flag, and Message for Reviewer columns. Varying formats can be implemented to accommodate implementations using third party document review applications. During document review, reviewers can self-run logic checks (sometimes referred to as self-QC), such as "a document with a responsive major category must have at least one issue tag selected" (which can be run as part of a query or part of an automatic data validation check). Any query on reviewed documents can include a limitation to isolate "human review" decision source documents from decision propagation target documents within or across the document review assignments.

In some implementations, the document propagation module 280 can build propagation components for duplicates (hash code and content duplicates, etc.). With some reviews, exact hash code duplicate and content duplicate documents can be "known" based off a scoring of one or more of the similarity analysis modules 230-250. With many reviews this has left gaps for other non-textual "excluded" duplicate files (such as a logo image with the same MD5 hash code attached to all emails) which are not submitted to the similarity analysis. As stated above, the current subject matter allows such excluded duplicate files to be identified (and optionally tagged with a particular exclusion type identifier) and separated in order to further optimize the overall review process.

With this arrangement, after a decision is finalized for a single document's instance from that duplicate group (either via a human reviewer 290 or by another technique including, without limitation, predictive coding, etc.), the document propagation module 280 can have that decision applied to/available to every other document which is considered a duplicate and part of that duplicate group. In general, it is presumed that the primary instance of a document (for example, the one with the lowest document ID) will be flagged as enabled (i.e., identified as being available and/or required for review). This flagged/enabled document can comprise the prime document which can be sent to the human reviewers 290 by the stack review distribution module.

Propagation logic within the document propagation module 280 can be written such that making a decision on a document will have the same decision applied across all the other documents that are duplicates of the originally changed document. This logic can provide tracking decision sources (i.e., the individual, software module, rule set, etc.) and the option of preserving a recorded human decision or prior "final" decision (such as cases where the process is used on a partially complete review that did not use "Family" and propagation methods).

Code to implement aspects of the current subject matter can be modular so that it can be run on a variety of document review platforms/modules. These code modules can be executed as necessary directly from within the review application when integrated through that review applications API.

If a decision is recorded on any document in a group other than the enabled document (e.g., the first instance, etc.) and those decisions conflict, the condition can be reported or brought to the attention of a human reviewer 290 to resolve. In addition, once any document in the group has a decision recorded by the document propagation module 280, it can become the "enabled" document and the original "enabled" is disabled if it has not already been reviewed.

For content duplicates, typically referring to documents with a score of 100% content match/similarity (or its equivalent) can be used by the document classification and characterization engine 220 to classify content duplicates. It can possible to see "exact" duplicate characteristics in documents with less than 100% content match. In some implementations, it is possible to set and classify a document as a "very near duplicate" of another document as a relaxed content duplicate, so that the review can benefit from near-duplicate propagation that does not require the commitment of an exact-duplication propagation. The near exact duplicates/content matches can be specified by grouping criteria. For example, the grouping criteria can be set such that documents having a metric rating (such as similarity score) of 97% or greater are grouped into a single stack $260_{i \ldots k}$.

Smart assignments that define a variety of criteria such as grouping rules and the like (which take precedence over the similarity analyses) can be assigned via a SQL based pseudo-application on a back end SQL database. This arrangement can allow for ad-hoc, customized ordering (prioritization) of a specific subset of documents within the corpus of documents 210; however it can sometimes have high technical requirements because it requires a user to directly run a stored procedure with advanced knowledge of what they are looking to achieve. Using the family structure described herein, smart assignments can be built as family complete assignments—as appropriate to be viewed/enabled. In addition, this smart assignment functionality can group documents based on other criteria such as relevance scores, keyword terms, privilege (using, for example, the DiscoverReady PrivBank™ system), other potentially privileged information, subject matter/concept/theme matched to individual reviewer knowledge and proficiency, document custodian, or based on other analytics. Data elements or query results from any type of database can be utilized. The smart assignments output can take a variety of forms including a flat file consumable by any review system.

The current subject matter can include and/or be integrated with predictive categorization which is applied to the stacks $260_{i \ldots k}$. Predictive categorization (as implemented by a predictive categorization module) can provide auto batch categorization that in turn reduces the number of documents that require human review. Such predictive categorization utilizes one or more predictive models (e.g., scorecard, neural network, support vector machines, etc.) which require training with historical data (i.e., a training set) in order to predict future results. For example, a predictive model can be trained using a minimum number of documents from random reliable prior decisions (e.g., decision whether a particular document should be produced, etc.) prior to making determinations. Even then prior decisions may not be sufficiently consistent (as represented by F-measure or stability indicator) or the issue may not be sufficiently present in the document collection (known as richness) to successfully or efficiently train.

The training set can be built using a variety of techniques—and in some cases are built using initial documents reviewed as part of a very large scale review. The decisions for the training set can be from the earliest review batches and can include decisions made before the rules are fully ingrained or the collection/custodian familiarity established. As with all reviews, such decisions must be as "right as possible" before they are used as part of a training set.

In a first implementation (sometimes referred to as a DiscoverReady APEX Review™), a training set can be selected from all review enabled documents and their family members can be into a targeted smart assignments so that training candidate documents are placed at the front of the queue/prioritization. This selection can be at least partially randomized and can also be used to test the review guidelines and review speeds (i.e., APEX) as well as other analyses.

In a second implementation, a training set can be selected without defining training candidates at the beginning of review. With such a situation, the rule can be applied to on-going review until the requisite number of documents (e.g., 10,000, etc.) are identified. A report can be provided to test the on-going review in order to determine when the requisite number of candidate documents are accumulated.

Once a predictive characterization module (which can be a code module, a separate local or remote application, etc.) has been provided with enough information to make determinations, documents can be given a relevance score by issue during an predictive characterization ranking/scoring process. Upper and lower thresholds with regard to score/ranking can be set to automatically categorized the document as "Not Responsive" or "Responsive" or "Privileged" based on its score; documents that fall between the thresholds set, also called the Grey Zone, can be categorized appropriately or not categorized and submitted to human review. A threshold score can be assigned and documents with relevance scores equal to or less than that threshold can be categorized accordingly. For example, if on a scale of 1 to 10 the threshold is a score of 7 for Responsiveness then a score equal to or greater than 7 would be categorized as "Responsive". In a one-sided logic no inference is made for score at the "low end" of the score range (e.g. <7).

As with all documents, the techniques/modules/application used to provide a type of metric such as similarity or relevance can be associated or otherwise form part of each document. The predictive categorization can be used by the stack review distribution module 270 as a supplement to review by the human reviewers 290 or it can be used an alternative approach (thereby bypassing human review altogether).

As noted in FIG. 2, the stack review distribution module 270 and/or the document propagation module 280 can provide feedback to the document classification and characterization engine 220. This feedback can be used, for example, to change grouping criteria used to define the stacks $260_{i \ldots k}$. The feedback can come from a variety of factors including changes in smart assignments as well as quality control (QC).

A QC process can be a tiered process, with the first tier of the process being run for every set of completed review batches or other necessary and appropriate group of reviewed documents and the additional tiers being run as-necessary. The purpose of the first tier is simply to establish the overall quality level of the review order for review management to determine whether the quality is acceptable or whether additional QC review will or may be necessary. Sampling can occur during the review process to assess the quality of human review decisions.

For an initial review quality estimator sample/test, a small sample is selected from a set of completed documents (review or other assignments or search results or reviewer (s)) and the human decision quality evaluated. This is a "sounding" test and may not be to a high confidence level or low margin of error (confidence interval). This sample can occur at the beginning of a review (or at review re-start) and at any time new reviewer(s) are added to the review team.

In some implementations, a sampler tool can be implemented that provides various metrics regarding the overall process (such as the Samplyzer™ system by DiscoverReady, LLC). The first tier of QC can require a random sampling of documents in order to provide a statistically sound quality measurement at an appropriate confidence level and margin of error. The random sampling can be taken from all documents and be sufficiently large to allow for error rate contribution analysis and human review accuracy estimates (i.e., a second tier QC analysis); using additional rules ensuring that there are enough representative documents from each source (content analysis, stacking, relevance, and human review) such that each source's statistical accuracy and margin of error can be derived. The overall quality of the review can include all propagation target documents, e.g. file hash & content duplicates, stacks, and predictive categorization logic). The population from which the sample is drawn can be recorded so that any statements about the statistical measured accuracy can be attributed to that set. All sampled documents can be placed into QC assignments for human evaluation. The review can be a "blind" (unbiased) re-review of the document decisions or an "agree/disagree" determination. In a blind re-review, QC document decisions can have their new decision recorded within a module or table tracking the source of this change. Reports can be run that provide statistical information on the accuracy of the decisions sampled, and provide the statistical accuracy and margin of error for both the load and the entire case.

Error rate reports can be run that provide statistical information on the accuracy of the decisions sampled and provide the statistical accuracy and margin of error for the load and the entire case and for each individual decision source/propagation method. If the quality level returned from a second tier QC review is below acceptable criteria, then appropriate remediation processes will occur to address quality in document sets affected by the identified process (es). At this time, the remediation processes can be being defined for each source and each source has a specific remediation pathway.

In some implementations, human review will account for less than 30% to over 70% of the review decisions. If is determined that the prime/stack propagation is a significant contributing factor to the error rate, prime/stack QCR (Quality Control Remediation) can occur. Appropriate sampling rules can be created to target only defined stack rank tiers and the lowest stack rank document in each stack. The document propagation module 280 can then provide feedback to the document classification and characterization engine 220 which can be used to change the criteria for forming the stacks using the similarity metrics and other information.

For a set, if a stack rank tier is not performing well, then uncorrected (i.e. not changed in remediation) documents from that tier can be re-assigned to direct attorney review. If a single tier is identified as an overall error rate contributor in more than twice sets of completed documents then in an on-going basis, documents in that stack rank range will be not be part of prime/stack propagation and immediately placed into a human review assignment.

If a prime for a stack is incorrect, then the prime can be corrected, the new "correct" decision for that prime will be saved as the "stack" decision. Documents in that stack which have not been evaluated and confirmed during any QC step (quality sample tier, stack remediation) can inherit the "corrected" decision. All newly added incremental documents to that stack can inherit the current stack decision.

If a prime is changed twice, then the stack can be excluded from prime/stack propagation and all incrementally added stack documents and can be immediately placed into a human review assignment.

When predictive categorization logic is a contributing factor to error rate, it may be a direct or indirect finding. Direct (like a human review—not a propagated source); Indirect (like a Duplicate or Stack propagation—from a Prime document or as a propagated source). A threshold score can be defined (equal to or greater than 7). The same set can be modeled to determine a narrowed range provides better results (e.g. threshold score greater than 8, 9, 9.5 and so on). If a more reliable result is achieved the threshold in the categorization logic can be adjusted. All documents which have not been evaluated and confirmed during any QC step can be immediately placed into a human review assignment.

In some cases, errors occur from hash/content duplicates. Such errors can be defined as two exact duplicate documents correctly warranting different and incompatible decisions (e.g. Responsive and Not Responsive). It is unlikely that propagation to exact duplicates will be a significant contributor to overall error rate. Errors in exact duplicate propagation will likely be the result of an incorrect human decision errors. When a relaxed duplicate standard is used, for example, between 98% and 100% similar of any exact duplicate then duplicate propagation can be a contributing factor to the overall error rate. To remediate the 'relaxed standard', the relaxed standard can be narrowed to a verifiable new range. (e.g., 99-100) and documents not in that range can be immediately placed into a human review assignment or subject to other appropriate propagation logic.

The impact of remediation on production sets can be reported. If the process, handling, and QC/Remediation of documents during incremental document loads create any change to existing decisions, and specifically decisions on documents or families that are part of a past or current or planned production set, a report can be generated to identify the document or family and the impact of the decision change on family production logic outcome. Even decision changes that do not change the family production logic outcome (Responsive or Not Responsive or Privilege) the family can be identified with no family product impact (no change). The report can be available to review management so that decisions can be made about how to address the families for which the change in production logic outcome upgrades a document or family—for example, a document is changed to Privilege and a Responsive family is upgraded to Privilege: the document and the family may need to be part of a "claw-back" request. In addition, it can be possible to keep the existing decision(s) and create an "acceptable" conflict (outlier) in duplicate, predictive coding and prime/stack propagation methods. These decisions can be excluded from any quality measurement and reports.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving a corpus of documents;
   characterizing similarities among the corpus of documents using at least three similarity algorithms having different similarity criteria, the characterizing comprising:
      obtaining contextual characteristics for each of the corpus of documents and associating the contextual characteristics with the corresponding document, the contextual characteristics selected from a group consisting of: similarity score, type of similarity algorithm used to characterize the document, document family, document type, and metadata describing properties of the document;
      first removing a first portion of the corpus of documents based on applying a first similarity algorithm to the corpus of documents;
      second removing, after the first removing, a second portion of the corpus of documents based on applying a second similarity algorithm to the corpus of documents; and
      third removing, after the first removing and the second removing, a third portion of the corpus of documents based on applying a third similarity algorithm to the corpus of documents, the third similarity algorithm based on a criteria other than that implemented by the first similarity algorithm and the second similarity algorithm, wherein the third similarity algorithm identifies conceptually similar documents in the corpus of documents based on content of each respective document, and wherein the conceptually similar documents are neither exact duplicates nor substantial duplicates;
   defining stacks of documents based on pre-defined grouping criteria as applied to the characterized similarities among the corpus of documents, the characterized similarities based on the first removing, the second removing, or the third removing;
   identifying, within each stack, a prime document; and
   initiating provision of each prime document to at least one human reviewer via a computer-implemented document review and characterization system.

2. The method as in claim 1, wherein at least one of the similarity algorithms identifies exact duplicates in the corpus of documents.

3. The method as in claim 1, wherein at least one of the similarity algorithms identifies substantial duplicates in the corpus of documents.

4. The method as in claim 1, wherein the pre-defined grouping criteria is adjusted based on quality control review of documents within the stack other than the corresponding prime document.

5. The method as in claim 1, further comprising: receiving data characterizing quality control review of at least a portion of the corpus of documents, the received data being used to modify the pre-defined grouping criteria to either increase or decrease one or more similarity metrics.

6. The method as in claim 1, wherein at least a portion of the corpus of documents comprise families of documents, the families of documents having a pre-defined logical interrelation.

7. A method comprising:

receiving a corpus of documents;

obtaining contextual characteristics for each of the corpus of documents and associating the contextual characteristics with the corresponding document, the contextual characteristics selected from a group consisting of: similarity score, type of similarity algorithm used to characterize the document, document family, document type, and metadata describing properties of the document;

generating a first subset of the corpus of documents by identifying and characterizing similarities among the corpus of documents based on applying a first similarity algorithm to the corpus of documents;

generating a second subset of the corpus of documents by identifying and characterizing similarities among the first subset of the corpus of documents based on applying a second similarity algorithm to the first subset of the corpus of documents, the second similarity algorithm having a relaxed similarity standard as compared to the first similarity algorithm; and generating a third subset of the corpus of documents by identifying and characterizing similarities among the corpus of documents based on applying a third similarity algorithm to the second subset of the corpus of documents, the third similarity algorithm having a similarity standard as other than that implemented by the first similarity algorithm and the second similarity algorithm, wherein the third similarity algorithm identifies conceptually similar documents in the corpus of documents based on content of each respective document, and wherein the conceptually similar documents are neither exact duplicates nor substantial duplicates;

defining stacks of documents based on pre-defined grouping criteria as applied to the second subset of the corpus of documents and the third subset of the corpus of documents;

identifying, within each stack, a prime document; and initiating provision of each prime document to at least one human reviewer via a computer-implemented document review and characterization system.

8. A non-transitory computer program product storing instructions, which when executed by at least one data processor of at least one computing system, result in operations comprising:

receiving a corpus of documents;

characterizing similarities among the corpus of documents using at least three similarity algorithms having different similarity criteria, the characterizing comprising:

obtaining contextual characteristics for each of the corpus of documents and associating the contextual characteristics with the corresponding document, the contextual characteristics selected from a group consisting of: similarity score, type of similarity algorithm used to characterize the document, document family, document type, and metadata describing properties of the document;

first removing a first portion of the corpus of documents based on applying a first similarity algorithm to the corpus of documents; and second removing, after the first removing, a second portion of the corpus of documents based on applying a second similarity algorithm to the corpus of documents; and third removing, after the first removing and the second removing, a third portion of the corpus of documents based on applying a third similarity algorithm to the corpus of documents, the third similarity algorithm based on a criteria other than that implemented by the first similarity algorithm and the second similarity algorithm, wherein the third similarity algorithm identifies conceptually similar documents in the corpus of documents based on content of each respective document, and wherein the conceptually similar documents are neither exact duplicates nor substantial duplicates;

defining stacks of documents based on pre-defined grouping criteria as applied to the characterized similarities among the corpus of documents, the characterized similarities based on the first removing, the second removing, or the third removing;

identifying, within each stack, a prime document; and initiating provision of each prime document to at least one human reviewer via a computer-implemented document review and characterization system.

9. The non-transitory computer program product as in claim 8, wherein at least one of the similarity algorithms identifies exact duplicates in the corpus of documents.

10. The non-transitory computer program product as in claim 8, wherein at least one of the similarity algorithms identifies substantial duplicates in the corpus of documents.

11. The non-transitory computer program product as in claim 8, wherein the pre-defined grouping criteria is adjusted based on quality control review of documents within the stack other than the corresponding prime document.

12. The non-transitory computer program product as in claim 8, wherein the operations further comprise: receiving data characterizing quality control review of at least a portion of the corpus of documents, the received data being used to modify the pre-defined grouping criteria to either increase or decrease one or more similarity metrics.

13. The non-transitory computer program product as in claim 8, wherein at least a portion of the corpus of documents comprise families of documents, the families of documents having a pre-defined logical interrelation.

14. A system comprising:

at least one data processor; and memory storing instructions, which when executed by the at least one data processor, result in operations comprising:

receiving a corpus of documents;

characterizing similarities among the corpus of documents using at least three similarity algorithms having different similarity criteria, the characterizing comprising:

obtaining contextual characteristics for each of the corpus of documents and associating the contextual characteristics with the corresponding document, the contextual characteristics selected from a group consisting of: similarity score, type of similarity algorithm used to characterize the document, document family, document type, and metadata describing properties of the document;

first removing a first portion of the corpus of documents based on applying a first similarity algorithm to the corpus of documents;

second removing, after the first removing, a second portion of the corpus of documents based on applying a second similarity algorithm to the corpus of documents; and third removing, after the first removing and the second removing, a third portion of the corpus of documents based on applying a third similarity algorithm to the corpus of documents, the third similarity algorithm based on a criteria other than that implemented by the first similarity algorithm and the second similarity algorithm, wherein the third similarity algorithm identifies conceptually similar documents in the corpus of documents based on content of each respective document, and wherein the conceptually similar documents are neither exact duplicates nor substantial duplicates;

defining stacks of documents based on pre-defined grouping criteria as applied to the characterized similarities among the corpus of documents, the characterized similarities based on the first removing, the second removing, or the third removing;

identifying, within each stack, a prime document; and initiating provision of each prime document to at least one human reviewer via a computer-implemented document review and characterization system.

\* \* \* \* \*